Oct. 18, 1966 K. G. BALEKDJIAN 3,279,306
OPTICAL COMPARISON SYSTEM FOR CHECKING
CRITICAL OBJECT DIMENSIONS
Filed Oct. 5, 1962 2 Sheets-Sheet 1

*INVENTOR.*
KEVORK G. BALEKDJIAN
BY
*Ezekiel Wolf, Wolf & Greenfield*
ATTORNEYS

Oct. 18, 1966

K. G. BALEKDJIAN
OPTICAL COMPARISON SYSTEM FOR CHECKING
CRITICAL OBJECT DIMENSIONS 3,279,306

Filed Oct. 5, 1962

INVENTOR.
KEVORK G. BALEKDJIAN
BY Ezekiel Wolf, Wolf & Greenfield
ATTORNEYS

United States Patent Office 3,279,306
Patented Oct. 18, 1966

3,279,306
OPTICAL COMPARISON SYSTEM FOR CHECKING CRITICAL OBJECT DIMENSIONS
Kevork G. Balekdjian, Natick, Mass., assignor to Image Instruments, Inc., Newton Lower Falls, Mass., a corporation of Delaware
Filed Oct. 5, 1962, Ser. No. 228,562
4 Claims. (Cl. 88—14)

The present invention relates in general to optical comparison and more particularly concerns a novel system for checking the physical dimensions of an object along closely spaced points about its perimeter by comparing the shadow of the object with suitable masks defining acceptable dimensional limits. A system according to the invention utilizes relatively few components to determine whether an object is within maximum and outside minimum acceptable dimensional limits.

It is an important object of this invention to provide a method and means for rapidly and accurately determining whether critical dimensions of an object fall within acceptable limits along a large portion of the perimeter of the object.

It is another object of the invention to achieve the preceding object with optical scanning techniques facilitating simultaneously determining by means of "go" and "no-go" tests whether the critical object dimensions are within minimum and maximum limits.

It is still another object of the invention to achieve the preceding objects with methods and means sufficiently flexible so that numerous different types of objects may be accurately checked with but slight changes in the apparatus requiring but a slight additional expenditure.

It is still another object of the invention to achieve the preceding objects with a system comprising relatively few components and operating with a high degree of reliability.

It is still another object of the invention to achieve the preceding objects with a logical system embodying relatively few components.

According to the invention, a substantially point source of energy rays having a wavelength shorter than dimensional errors to be detected traverses both the object subject to said errors and means defining at least one acceptable dimensional limit of the object. These system elements coact by selectively transmitting energy to radiant energy responsive means providing pulses having leading and trailing edges. Logical circuitry responds to the existence and time separation between the leading and trailing edge of the pulse to provide an indication of the acceptability of the object being examined.

Numerous other features, objects and advantages of the invention will become apparent from the following specification when read in connection with the accompanying drawing in which.

Figure 1:
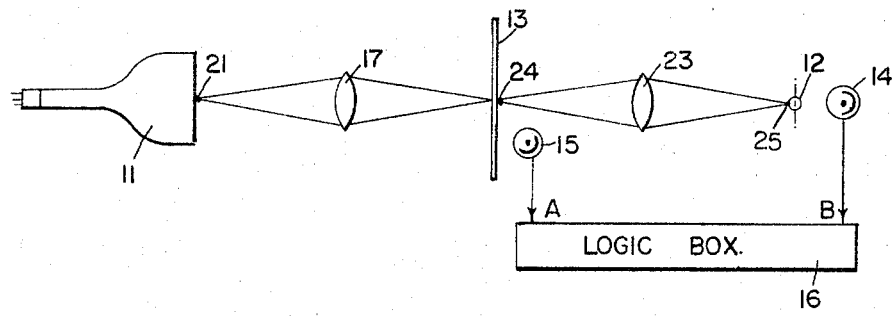
FIG. 1 is a pictorial representation illustrating the logical arrangement of a typical system according to the invention.

With reference now to the drawing and more particularly FIG. 1 thereof, there is illustrated a pictorial representation generally illustrating the logical arrangement of a system according to the invention. A flying spot scanner cathode ray tube 11 provides a moving point source of light which effectively scans the object 12 being examined and the mask 13 defining acceptable dimensional limits to develop light signals. These light signals energize object photocell 14 and mask photocell 15, respectively, to provide pulse signals interpreted by logic box 16 for indicating whether the object 12 is within acceptable dimensional limits.

The flying spot scanner cathode ray tube 11 functions as a source of a moving spot of light developed in the usual manner by deflecting the electron beam producing the light spot on the phosphorescent screen. Since flying spot scanners are well known in the art and further discussion and illustration might tend to obscure the present invention, a detailed description of a flying spot scanner system is not included.

A lens 17 focuses the flying spot 21 on the surface of mask 13 and coacts with lens 23 to focus the rays originating from flying spot 21 transmitted by the clear region of mask 13 upon object 12. Thus, the image 24 of flying spot 21 scans mask 13, and if the clear region of the mask is encountered, image 25 scans object 12 in synchronism. Typically, the scanning is rectangular, but it may be advantageous to employ criss-cross or radial scanning in some applications.

Figure 2:
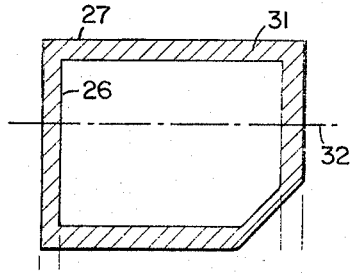
FIG. 2 illustrates an exemplary embodiment of a mask according to the invention for defining acceptable dimensional limits.

Mask 13 may include both opaque and translucent or clear portions as better seen in FIG. 2. The perimeter of the inside clear portion 26 may correspond to the minimum acceptable dimensional limit of the object being examined while the inside perimeter of the outside clear portion 27 may correspond to the maximum acceptable dimensional limits of the object. The opaque portion 31 then corresponds to the range of acceptable dimensional limits of the object.

Figure 3:
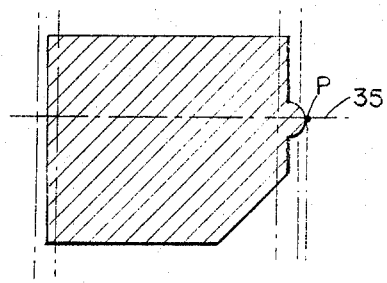
FIG. 3 shows an example of an object which is not acceptable at point P.
Figure 4:
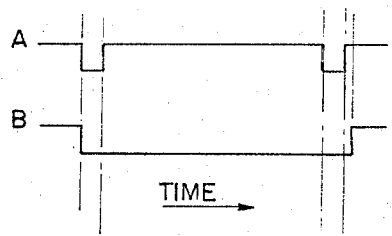
FIG. 4 is a graphical representation of signal waveforms plotted to a common time scale and showing the relation of the different waveforms to the spot position on the mask along the scanning line shown helpful in understanding the principles of the invention.

As image 24 scans from left to right mask photocell 15 receives light energy only when the spot image 24 is not focused upon the opaque portion 31 so that in scanning along a typical line 32, mask photocell 15 does not receive light energy for two spaced intervals to produce corresponding output pulses shown in FIG. 4A. At the same time spot 25 scans object 12 along line 35 (FIG. 3) to produce the object photocell output shown in FIG. 4B.

Figure 5:
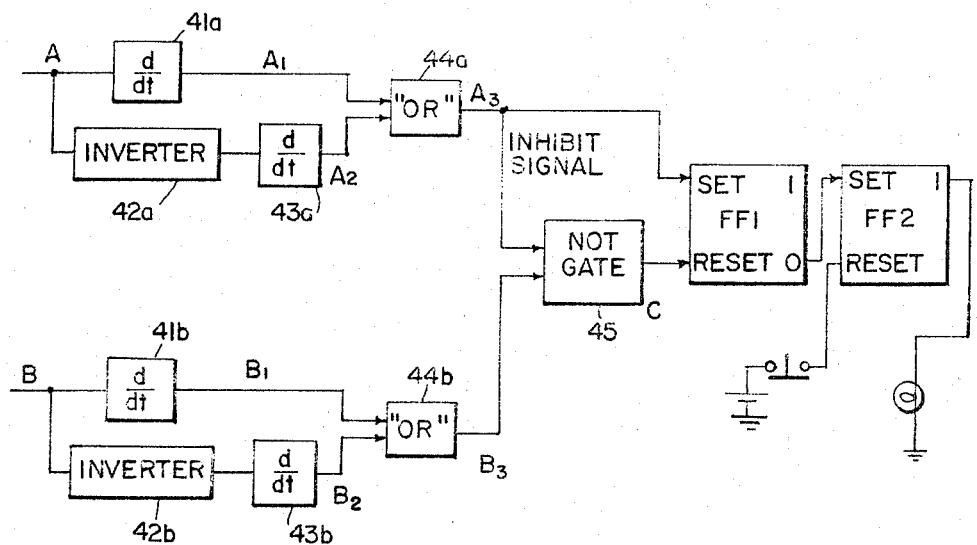
FIG. 5 is a block diagram illustrating the logical arrangement of a preferred form of logic box for interpreting pulse signals derived during the inspection process.
Figure 6:
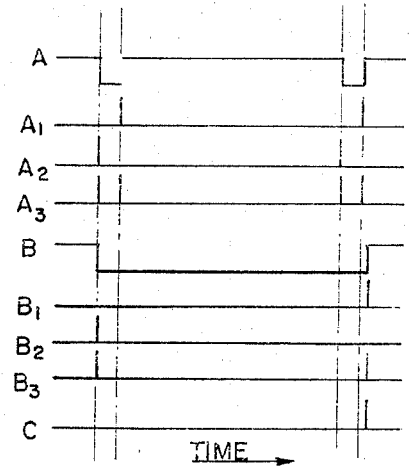
FIG. 6 shows various signal waveforms to a common time scale at the designated points in the system of FIG. 5.

Each of these pulse pairs is differentiated and "OR" gated together by the logic box 16 including the logical circuitry of FIG. 5 to produce waveforms A3 and B3 as shown in FIG. 6 at the points indicated in FIG. 5.

The signal path between input A and point A3 and the path between input B and point B3 each include a positive going edge differentiator 41 in parallel with an inverter 42 followed by a positive going edge differentiator 43, the outputs of differentiators 41 and 43 being applied to respective legs of an OR gate 44.

The logic of this novel inspection scheme is based on the realization that whenever at a given instant of time, a pulse exists on line B3, there must be a pulse on line A3 also in order to have an acceptable object. Note that for every pulse on A3, there need not be a corresponding pulse on B3 for an acceptable object. The logic of FIG. 5 is designed such that at every instant of time that a pulse is detected on line B3, a corresponding pulse is expected on line A3 in order to classify the object as acceptable.

The "Not-Gate" 45 (sometimes called "And-Inhibitor") of FIG. 5 is a logical element which gives a pulse out on line C if and only if there is a pulse on the line connected to B3 and no pulse on line A3. If this occurs, then the object will be classified as a reject.

The flip-flop FF1 is constantly being set by each pulse at point A3. However, if a pulse occurs on line C, this will change the state of flip-flop FF1 to "0." The latter will change the state of flip-flop FF2 to "1." A lamp or other suitable signaling device will be turned on to indicate a reject object. The flip-flop FF2 stays in the "1" state signifying a reject until reset by means of a push button.

There has been described a novel optical comparison system for examining an object and making a point-by-point comparison with an acceptable reference frame to determine whether the object meets acceptable dimensional limits. The apparatus is relatively free from complexity, reliable and rapid.

It is apparent that those skilled in the art may now make numerous modifications of and departures from the specific embodiment illustrated and described herein without departing from the inventive concepts. Consequently, the invention is to be construed as limited only by the spirit and scope of the appended claims.

What is claimed is:
1. Optical comparison apparatus comprising:
  (a) a source of moving light spot;
  (b) masking means comprising translucent and opaque areas defining acceptable tolerances of an object for selectively transmitting light energy originating from said source to provide a first type of light signal when impinging upon that portion of said masking means within the area thereof defining acceptable tolerances of said object in the absence of said object wherein said opaque areas correspond to the acceptable dimensional tolerances;
  (c) means for focusing said moving light spot upon said masking means;
  (d) means for focusing said moving light spot upon an image plane spaced from said masking means only when also focused upon the translucent areas of said masking means;
  (e) photoelectric transducing means responsive to said light signal for providing a first level when said spot produces said light signal and a second level at other times whereby said first level occurs while said spot is within the area between an acceptable object dimension and the limit of an acceptable tolerance defined by said masking means to provide signal pulses having leading edges and trailing edges spaced in time, said photoelectric transducing means comprising a first photoelectric transducer responsive to said moving light spot being focused upon said translucent area to only then produce said first level and a second photoelectric transducer responsive to said moving light spot being focused as said second image upon and transmitted across said image plane to only then produce said first level;
  (f) logical circuit means responsive to the occurrence of said leading and trailing edges comprising means for producing a pulse in response to each of said level changes, and a not-gate inhibited on a first leg by the pulses produced in response to said first level changes and otherwise activated on a second leg by the pulses produced in response to said second level changes to provide a reject pulse only when said second leg received a pulse while pulses are absent from said first leg;
  (g) means for providing a signal representative of the acceptability of said object dimensions;
  (h) means for coupling the outputs of said first and second photoelectric transducers to said logical circuit means to provide said signal representative of the acceptability of said object dimensions; and,
  (i) means for providing an output signal indicating acceptability only when a change in the output level of said second photoelectric transducing means bears a coincident time relationship to the change in the output level of said first photoelectric transducing means.

2. Optical comparison apparatus in accordance with claim 1 and further comprising a first bistable device set in a first state in response to a pulse also applied to said first leg and reset to a second state by a said reject pulse.

3. Optical comparison apparatus in accordance with claim 2 and further comprising a second bistable device assuming its first stable state in response to said first bistable device being in said second state, and control means for resetting said second bistable device to its second stable state.

4. Optical comparison apparatus in accordance with claim 3 and further comprising means for indicating the state of said second bistable device.

References Cited by the Examiner

UNITED STATES PATENTS 2,470,877   5/1949   Stuland _____ 88—14

FOREIGN PATENTS 963,842   7/1964   Great Britain.

OTHER REFERENCES

Automatic Optical Sensing of Scope Output, B. F. Hairobedian, IBM Technical Disclosure Bulletin, vol. 3, No. 11 (April 1961) p. 59.

JEWELL H. PEDERSEN, *Primary Examiner.*

W. L. SIKES, *Assistant Examiner.*